(12) United States Patent
Chen et al.

(10) Patent No.: US 8,622,676 B2
(45) Date of Patent: Jan. 7, 2014

(54) SCREW STRUCTURE

(75) Inventors: Yun-Lung Chen, New Taipei (TW); Chung Chai, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 89 days.

(21) Appl. No.: 13/406,645

(22) Filed: Feb. 28, 2012

(65) Prior Publication Data

US 2013/0017037 A1 Jan. 17, 2013

(51) Int. Cl.
*F16B 43/00* (2006.01)

(52) U.S. Cl.
USPC .......................... 411/402; 411/371.2; 411/999

(58) Field of Classification Search
USPC .............. 411/371.2, 378, 397, 402, 404, 974, 411/999
See application file for complete search history.

(56) References Cited

U.S. PATENT DOCUMENTS

| | | | | |
|---|---|---|---|---|
| 2,036,875 A | * | 4/1936 | Kraft | 215/360 |
| 4,641,986 A | * | 2/1987 | Tsui et al. | 403/164 |
| 5,248,176 A | * | 9/1993 | Fredriksson | 294/215 |
| 5,405,210 A | * | 4/1995 | Tsui | 403/119 |
| 5,634,734 A | * | 6/1997 | Schron et al. | 403/78 |
| 5,743,576 A | * | 4/1998 | Schron et al. | 294/215 |
| 7,114,872 B2 | * | 10/2006 | Alba | 403/78 |

* cited by examiner

*Primary Examiner* — Roberta Delisle

(74) *Attorney, Agent, or Firm* — Altis Law Group, Inc.

(57) ABSTRACT

A screw structure for securing a first object to a second object comprises a screw member, a blocking member and a pivot member. The screw member comprises a cap and a pole extending from the cap. The blocking member is captive on the pole and defines a latching groove. The pivot member comprises a latching portion elastically engaged in the latching groove and located beneath the cap. The pivot member can be raised up and lowered down, and twisted to activate the screw function.

16 Claims, 4 Drawing Sheets

SCREW STRUCTURE

BACKGROUND

1. Technical Field

Present disclosure relates to screw structures, and particularly to a screw structure which can secure a first object member to a second object member.

2. Description of Related Art

Screws are necessary in all kinds of industries. A screw is configured for securing a first object to a second object, such as securing a frame or a cover to a computer enclosure. However, an extra tool, namely a screwdriver, may be needed both for assembly and disassembly, and the requirement for an extra tool may be inconvenient for users.

Therefore, there is room for improvement within the art.

BRIEF DESCRIPTION OF THE DRAWINGS

Many aspects of the embodiments can be better understood with reference to the drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
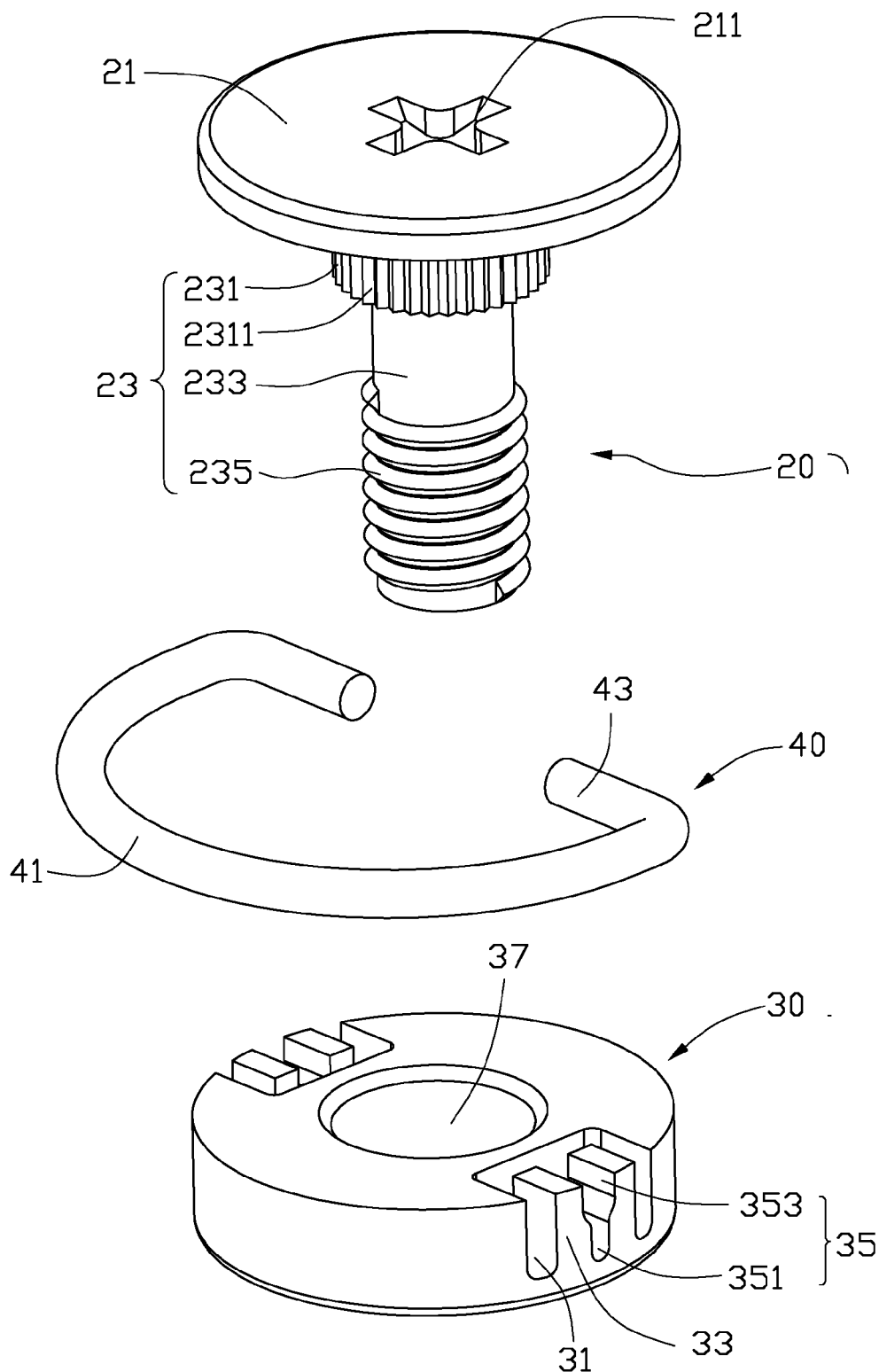
FIG. 1 is an exploded, isometric view of an embodiment of a screw structure.

Referring to FIG. 1, a screw structure in accordance with an embodiment comprises a screw member 20, a blocking member 30 and a pivot member 40. The screw structure is configured for securing a first object member 50 (shown in FIG. 4) to a second object member 60 (shown in FIG. 4).

The screw member 20 comprises a cap 21 and a pole 23 extending from the cap 21. A last-resort configuration 211 is defined in the cap 21. In one embodiment, the cap 21 is substantially circular. The pole 23 comprises a positioning portion 231, a connecting portion 233 and a screw portion 235. The positioning portion 231 extends from the cap 21, and a plurality of elongated teethes 2311 is located on the periphery of the positioning portion 231. In one embodiment, diameter of the positioning portion 231 is smaller than the cap 21. The connecting portion 233 extends from the positioning portion 231. In one embodiment, diameter of the connecting portion 233 is smaller than the positioning portion 231. The screw portion 235 extends from the connecting portion 233. In one embodiment, diameter of the screw portion 235 is greater than the connecting portion 233.

A cutout 31 is defined in opposite sides of the blocking member 30. A resilient piece 33 is located in the cutout 31. A latching groove 35 is defined in the resilient piece 33. The latching groove 35 comprises a wide portion 351 and a narrow portion 353 communicating with the wide portion 351. A through hole 37 is defined in a center of the blocking member 30, for receiving the positioning portion 231. In one embodiment, the blocking member 30 is substantially columnar, the through hole 37 is substantially circular, and the outer diameter of the cap 21 is substantially equal to the outer diameter of the blocking member 30.

The pivot member 40 comprises an operating portion 41 and two latching portions 43 extending from two opposite ends of the operating member 41. In one embodiment, the operating portion 41 is arched so as to resemble a semicircle.

Figure 2:
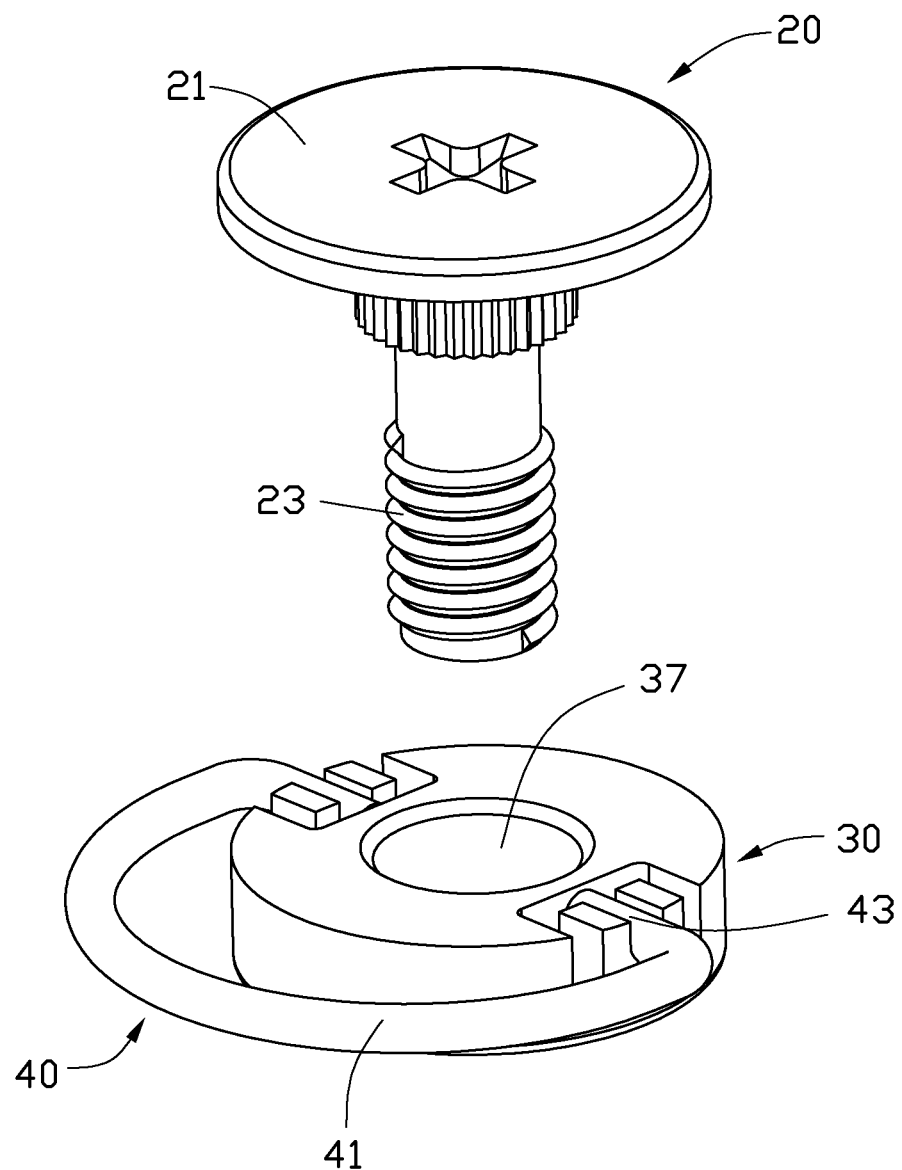
FIG. 2 is another exploded, isometric of the screw structure of FIG. 1.
Figure 3:
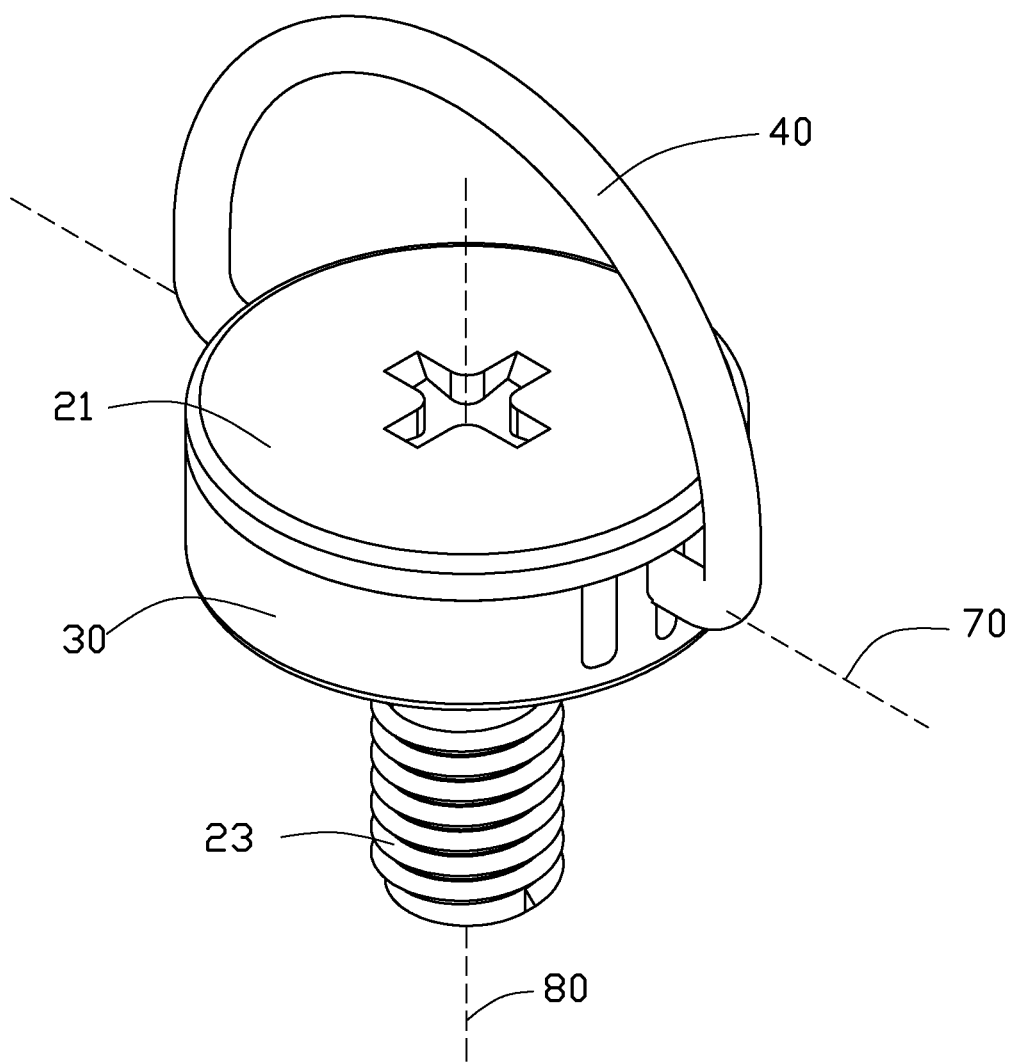
FIG. 3 is an assembled view of the screw structure of FIG. 1.

Referring to FIGS. 2-3, in assembly, each of the two latching portions 43 engages in a latching groove 35. The pole 23 of the screw member 20 extends through the through hole 37 and engages in the through hole 37. The cap 21 rests on the blocking member 30. Each of the two latching portions 43 is sandwiched between the cap 21 and the blocking member 30. In one embodiment, the blocking member 30 is secured to the positioning portion 231 by means of an interference fit. The screw structure is thereby assembled.

Figure 4:
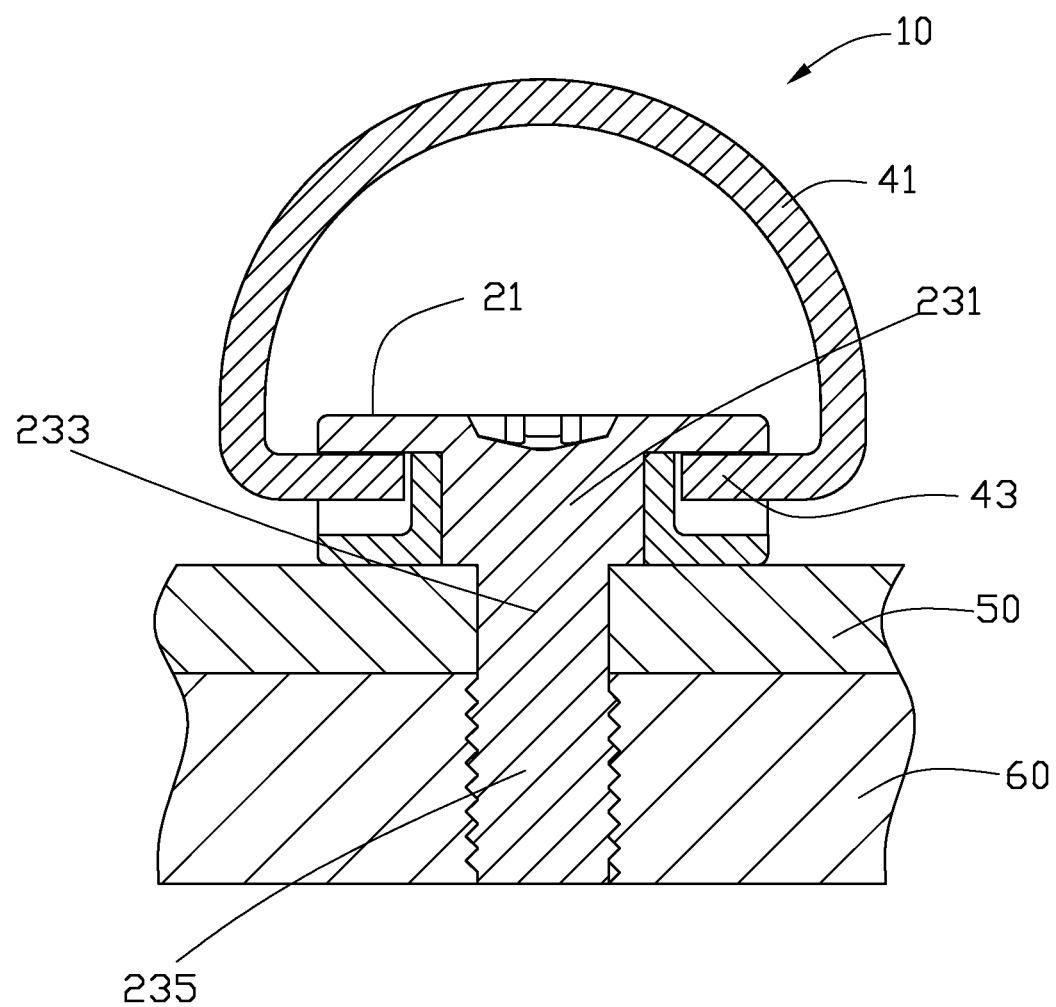
FIG. 4 is a cross-sectional view of the screw structure securing a first object and a second object together.

Referring to FIG. 4, in use, the operating portion 41 of the screw structure is raised and twisted, and the operating portion 41 is rotated round a pivot axis 70, and an end of the pole 23 is aligned with an installation hole (not labeled) defined in the first object member 50. The operating portion 41 is rotated around a center axis 80 in a first direction to push the pole 23 through the installation hole of the first object member 50. The screw portion 235 is screwed into a threaded securing hole of the second object member 60. In one embodiment, the pivot axis 70 is substantially perpendicular to the center axis 80.

In disassembly of the screw structure, the operating portion 41 is rotated in a second direction opposite to the first direction, and the screw portion 235 is disengaged from the threaded securing hole of the second object member 60, until the pole 23 can be freed from the installation hole of the first object member 50. Thereby, the screw structure is removed.

It is to be understood, however, that even though numerous characteristics and advantages have been set forth in the foregoing description of embodiments, together with details of the structures and functions of the embodiments, the disclosure is illustrative only and changes may be made in detail, especially in the matters of shape, size, and arrangement of parts within the principles of the disclosure to the full extent indicated by the broad general meaning of the terms in which the appended claims are expressed.

What is claimed is:

1. A screw structure comprising:
a screw member, the screw member comprising a cap, and a pole extending from the cap;
a blocking member secured to the pole, the blocking member defining a latching groove; and
a pivot member, the pivot member comprising a latching portion, the latching portion engaged in the latching groove and located between the cap and the blocking member; and the pivot member is rotatable relative to the screw member and the blocking member;
the pole comprises a positioning portion extending from the cap, the blocking member defines a through hole, and the positioning portion is engaged in the through hole to secure the blocking member to the screw member; and
a plurality of elongated teeth is located on the positioning portion, and the blocking member is secured to the plurality of elongated teeth.

2. The screw structure of claim 1, wherein the pole further comprises a connecting portion extending from the positioning portion, a diameter of the connecting portion is smaller than a diameter of the positioning portion, and the diameter of the positioning portion is smaller than a diameter of the cap.

3. The screw structure of claim 2, wherein the pole comprises a screw portion extending from the connecting portion, and a diameter of the screw portion is smaller than the diameter of the positioning portion.

4. The screw structure of claim 1, wherein two resilient pieces are located on the blocking member; and the latching portion is elastically engaged between the two resilient pieces.

5. The screw structure of claim 4, wherein the latching groove is defined between the two resilient pieces, the latching groove comprises a wide portion and a narrow portion communicating with the wide portion, and the latching portion is pivotally engaged in the wide portion.

6. The screw structure of claim 1, wherein a section of the cap and a section of the blocking member are circle-shaped, and a diameter of the cap is substantially equal to a diameter of the blocking member.

7. The screw structure of claim 1, wherein the pivot member further comprises an operating portion adapted to rotate the screw structure, and the operating portion is substantially arc-shaped.

8. The screw structure of claim 1, wherein the blocking member defines a pivot axis and the pivot member is rotatable around the pivot axis, the screw structure defines a center axis and the pivot member is rotatable around the center axis, and the pivot axis is substantially perpendicular to the center axis.

9. A screw structure adapted to secure a first object to a second object comprising:
   a screw member, the screw structure comprising a cap, and a pole extending from the cap;
   a blocking member, the blocking member defining a latching groove and a through hole; and
   a pivot member, the pivot member comprising a latching portion, the latching portion elastically engaged in the latching groove and located between the cap and the blocking member;
   wherein the pole extends through the through hole to secure the blocking member to the pole; and the pole is engaged with the first object and the second object; and the pole can be disengaged from the first object and the second object by rotating the pivot member;
   the pole comprises a positioning portion, the positioning portion is engaged in the through hole; and
   a plurality of elongated teeth is located on the positioning portion, the blocking member is engaged with the plurality of elongated teeth.

10. The screw structure of claim 9, wherein the positioning portion extends from the cap, and a diameter of the positioning portion is smaller than a diameter of the cap.

11. The screw structure of claim 9, wherein the pole further comprising a connecting portion extending from positioning portion, and a screw portion extending from the connecting portion, the connecting portion is received in the first object, and the screw portion is engaged in the second object.

12. The screw structure of claim 11, wherein a diameter of the connecting portion is smaller than a diameter of the positioning portion, and a diameter of the screw portion is smaller than a diameter of the positioning portion.

13. The screw structure of claim 9, wherein the blocking member defines a pivot axis and the pivot member is rotatable around the pivot axis, the screw structure defines a center axis and the pivot member is rotatable around the center axis, and the pivot axis is substantially perpendicular to the center axis.

14. The screw structure of claim 9, wherein two resilient pieces are located on the blocking member, and the latching portion is elastically engaged between the two resilient pieces.

15. The screw structure of claim 9, wherein a section of the cap and a section of the blocking member are circle-shaped, and a diameter of the cap is substantially equal to a diameter of the blocking member.

16. The screw structure of claim 15, wherein the pivot member further comprises an operating portion adapted to rotate the screw structure, and the operating portion is substantially arc-shaped.

* * * * *